United States Patent [19]
Lowery

[11] Patent Number: 5,590,754
[45] Date of Patent: Jan. 7, 1997

[54] BLADE FEEDER CONVEYOR SYSTEM

[76] Inventor: Sterling W. Lowery, 4860 Sadler Rd., Glen Allen, Va. 23060

[21] Appl. No.: 432,968

[22] Filed: May 1, 1995

[51] Int. Cl.⁶ .................................................. B65G 65/02
[52] U.S. Cl. ............................................ 198/514; 198/512
[58] Field of Search .................................. 198/525, 537, 198/560, 509, 510.1, 512, 514

[56] References Cited

U.S. PATENT DOCUMENTS

| | | | |
|---|---|---|---|
| 4,228,890 | 10/1980 | Tothfalusi | 198/514 |
| 4,641,888 | 2/1987 | LeBegue et al. | 198/514 X |
| 4,714,154 | 12/1987 | Harhoff et al. | 198/514 |

FOREIGN PATENT DOCUMENTS

| | | | |
|---|---|---|---|
| 1039007 | 10/1953 | France | 198/512 |
| 2257520 | 8/1975 | France | 198/537 |
| 0737738 | 9/1955 | United Kingdom | 198/512 |

*Primary Examiner*—James R. Bidwell

[57] ABSTRACT

A conveying system for heavy material such as overburden that contains large rocks as well as small rocks and dirt. The system has a feed system using two blades that rotate over an apron to push material onto the conveyor and a transition assembly between conveyors that lessens the impact of large rock as it drops from one conveyor onto the next conveyor.

12 Claims, 8 Drawing Sheets

BLADE FEEDER CONVEYOR SYSTEM

FIELD OF THE INVENTION

The invention relates generally to an improved conveyor system used in the movement of large quantities of heavy material.

BACKGROUND OF THE INVENTION

One of the most common arrangements for moving large quantities of heavy material such as overburden from strip mining operations, earth from excavation operations, and other similar material movement, is to load/utilize large trucks. Loading of the trucks is accomplished by means of front end loaders, electric/hydraulic shovels, or conveyor systems.

In terms of front end loaders and electric/hydraulic shovels, large buckets are filled with material and then swung into position over the truck where the material is dumped. Cycle times for loading a truck are dependent on the size of the buckets and the speed of the loaders/shovels. The current state-of-the-art uses 13–22 yard capacity loader/shovels while the trucks have at least five times this capacity. Cycle time for the scooping and dropping of a load is on the order of 40 seconds or more. Thus, loading cycle times are on the order of 3–4 minutes.

In terms of conveyor systems, material is pushed onto one end of a conveyor and conveyed to the other end of the conveyor which hangs over the truck bed. However, standard heavy-duty conveyor systems are nominally 6–8 feet wide while the equipment (e.g., bulldozers) used to push material to the conveyor can be up to 22–24 feet in width. Accordingly, a variety of conveyor feed systems have been developed to funnel the delivery area into the narrower conveyor width. Such feed systems include those disclosed in U.S. Pat. Nos. 4,011,936.

In U.S. Pat. No. 4,011,936, a conveyor apron is initially at ground level and is filled with material. The apron is then pivoted upward to allow the material to be gravity fed onto the conveyor. However, this results in down time in terms of loading the apron since the apron must be lifted off the ground to get the material onto the moving conveyor. This increases the overall loading cycle time. Further, this system is not well suited for large size material encountered in strip mining overburden.

SUMMARY OF THE INVENTION

Accordingly, it is an object of the present invention to provide a conveyor system with rotating pusher blades and apron not prone to jamming for the loading of sequential conveyors or heavy-duty trucks.

One object of the present invention is to provide an easy transition from one conveyor to another when the conveyors are used in sequence and large trucks are replaced by moveable conveyors.

Another object of the present invention is to provide a conveyor system with rotating pusher blades and apron not prone to jamming that reduces load cycle time when loading trucks.

A further object of the present invention is to provide a conveyor system with rotating pusher blades and apron that is simple and rugged in design to withstand around-the-clock operation.

Other objects and advantages of the present invention will become more obvious hereinafter in the specification and drawings.

DETAILED DESCRIPTION OF THE DRAWINGS

Figure 1:
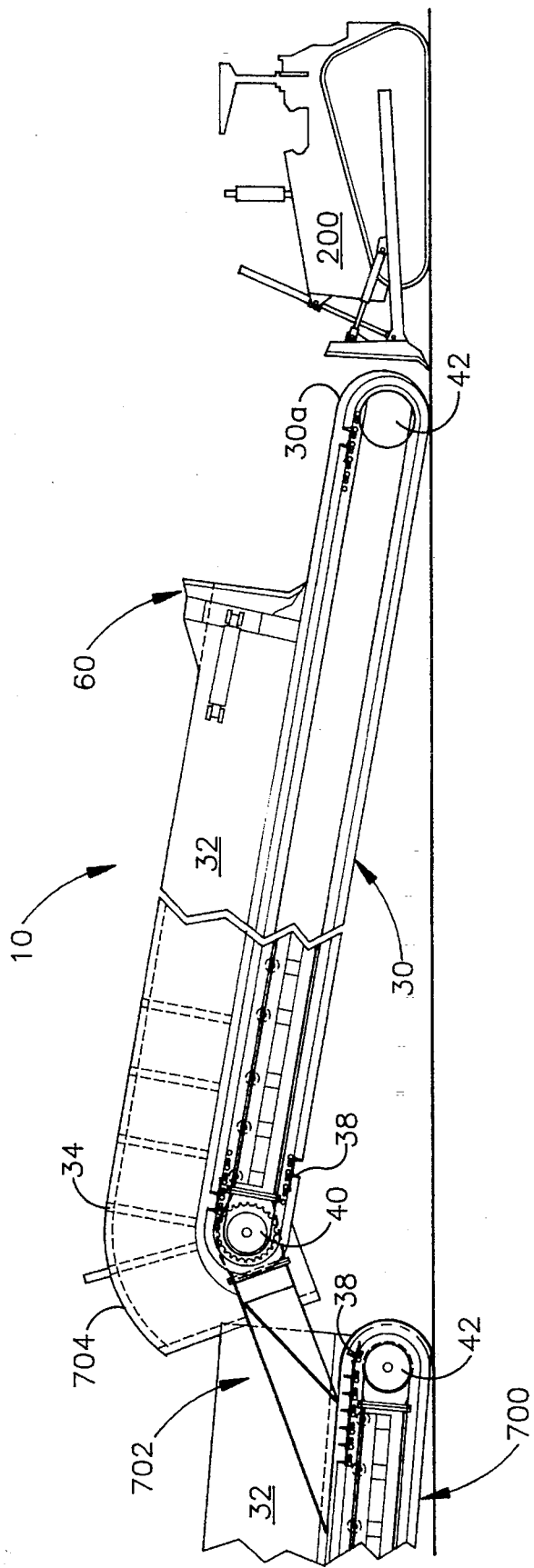
FIG. 1 is a schematic side view of the present invention showing the pusher blade and apron area of a conveyor feeding onto a second conveyor with a transition arrangement between the conveyors.

Referring now to the drawings, and more particularly to FIG. 1, there is shown a schematic side view of the system of this invention. For purposes of clarity, the left part of the conveyor 700 is omitted as well as the supporting frame members of the conveyor system 10 and some other of the components. What is shown is the schematic of a typical system used for conveying heavy material such as overburden from strip-mining operations where the overburden is pushed by bulldozer 200 to the inlet end 30A of conveyor 30. The inlet in has a rotating pusher blade and apron assembly 60 which is more fully explained with reference to FIGS. 5–7. The conveyor 30 has a continuous path conveyor belt 38, a drive sprocket 40 and an idler sprocket 42. The conveyor system 10 also has angled or flared sides 32 to hold the heavy material onto the conveyor surface.

The conveyor system as shown in FIG. 1 has its exit end 704 shown in cross-section and differs from the conveyor of FIGS. 5–8 by including a transition assembly 702 which will be explained more fully below. The angled or flared sides 32 are supported by angle frames 34. The material being conveyed by conveyor system 10 is dumped onto the inlet end of conveyor 700. Conveyor 700 is one of a series of conveyors that may be arranged in sequence to convey the material from the site where it is collected to the site where it is used to fill or dump the material. Sometimes the site where it is dumped is an older area that has been strip-mined and the material is used to re-contour the area or it may be used to fill a depression or valley or whatever is appropriate for the job. In this type of an arrangement, trucks are not used to convey the material, but a moveable conveyor 700 is utilized which is similar to the conveyor system 10 except it does not have the rotating pusher blade and apron assembly 60. It does have it own drive mechanism such as a drive sprocket 40 not shown but like that shown in FIG. 5, and a moveable support similar to that shown in FIGS. 5–8. Conveyor 700 also has at its exit end a transition assembly 702, the same as conveyor system 10 of FIG. 1.

Thus, with this arrangement, heavy material can be moved from a collection site to a dump site by first of all using the conveyor system 10 with its rotating pusher blade and apron assembly for collecting material and conveying the material that has been pushed thereon by the bulldozer. This is more fully described in connection with FIGS. 5, 6 and 7. The material conveyed by conveyor system 10 is then dumped onto a moveable conveyor 700 which usually is on the order of 50–100 feet in length. From conveyor 700, the material dumped onto another conveyor similar to 700 which is likewise moveable and positioned under the exit end of conveyor 700. A sufficient number of individual conveyors like 700 are arranged in sequence to reach the dump site. As the collection site is moved further from the dump site, additional conveyors are added. The movement of conveyor 700 and similar conveyors is facilitated by their moveable frame similar to that used in FIG. 8.

The conveyor system would typically be used for the overburden of heavy rock strata that is over the top of coal seams, which in some cases can be anywhere from 5 feet to 100 feet thick and must be removed to get to the coal. The use of the conveyor system of this invention takes the overburden and conveys it by combining conveyors so that the first conveyor system 10 at the collection site dumps right off to the next conveyor and conveyors are added until the material reaches the dump site, such as a valley fill, reclamation area, or other dump area. Generally speaking, there are approximately 10–12 bank cubic yards of overburden that have to be removed for each bank cubic yard of coal. A typical job could involve 45–50 million bank cubic yards of overburden for removal in a year which is a huge quantity of material. Also, the material of the overburden demands that the conveyor be big and heavy since the overburden is usually broken up by dynamite and has some chunks or pieces that can be 5 to 8 feet in diameter, but more typically the overburden material ranges from dirt up to 2, 3 and 4 foot boulders or chunks with the dirt and small pieces being in a range of 60–80% of the total material.

When the large rocks exit off the end of one conveyor to fall onto the inlet end of the next conveyor in sequence, there could be a tremendous impact on the receiving conveyor. To lessen this impact, the transition assembly 702, which is part of the present invention, is utilized. This has a series of fingers which permit the large boulders to slide onto the inlet end of the next conveyor, but first permits the small dirt and other overburden to fall directly onto the inlet end of the conveyor to form a cushion layer which the boulders impact when they are slid onto the conveyor. This will be more fully explained in connection with FIGS. 2, 3 and 4.

Figure 2:
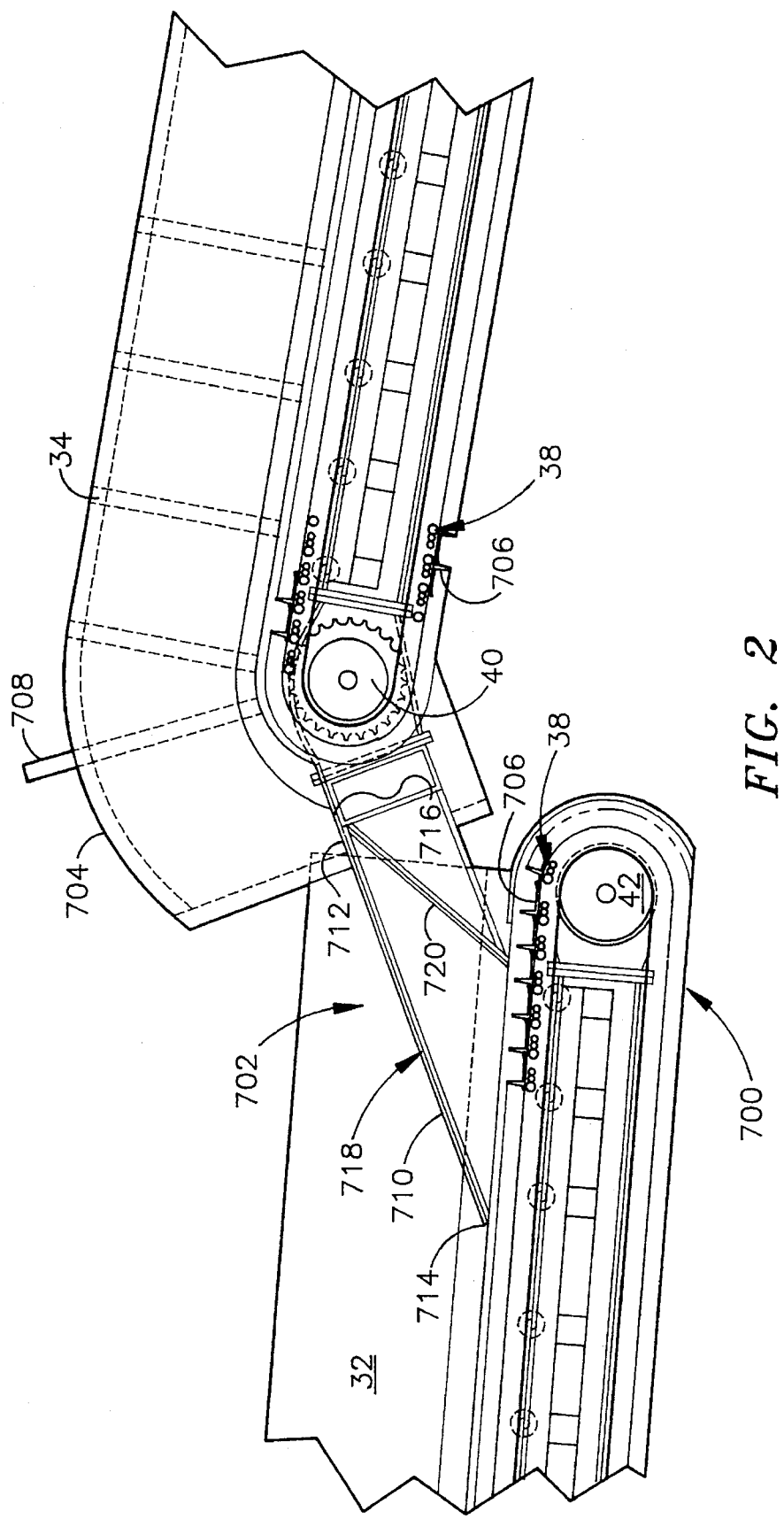
FIG. 2 is an enlarged cross-section view of the transition arrangement between two conveyors.
Figure 3:
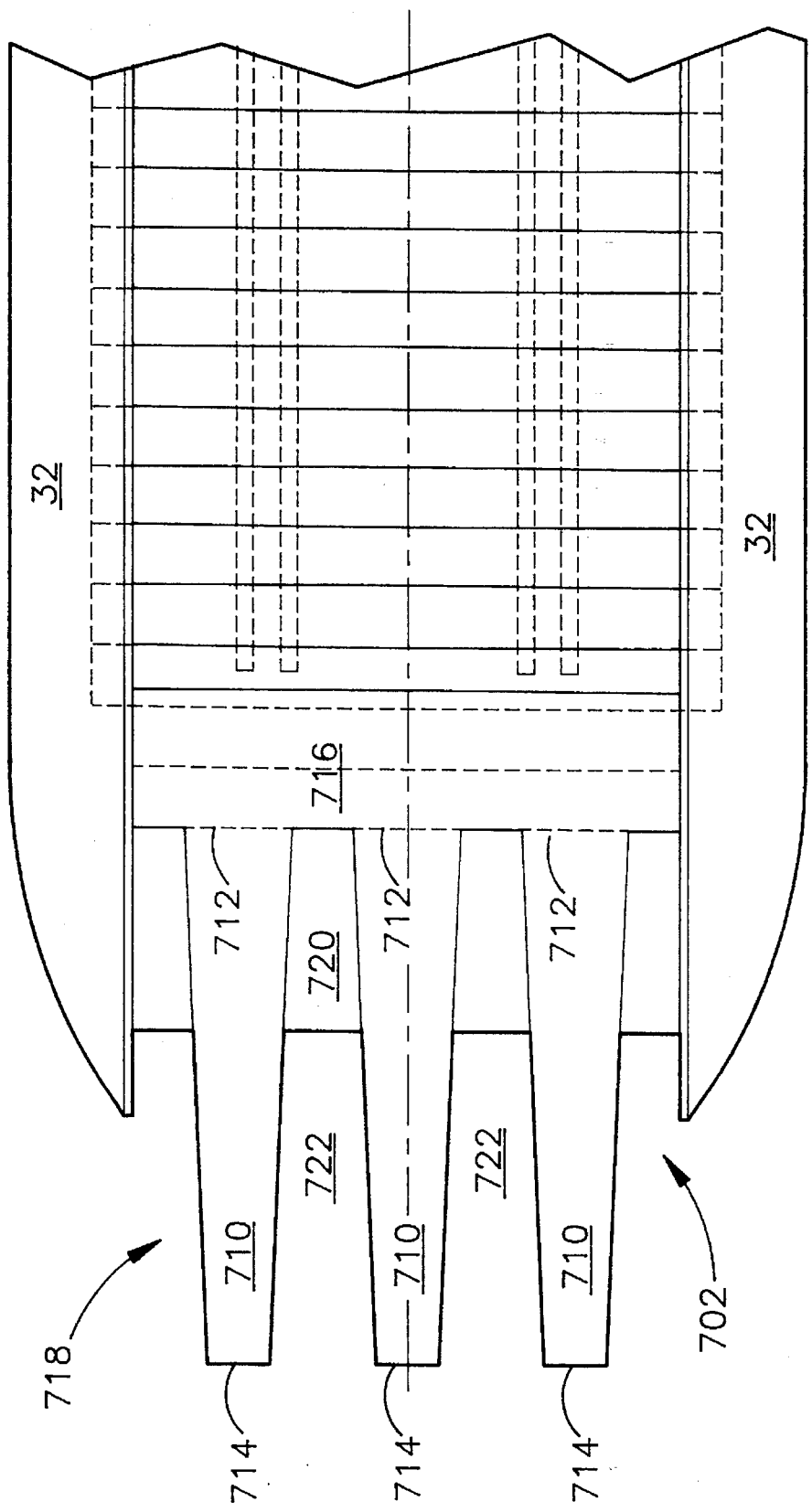
FIG. 3 is a partial plan view showing the fingers and related parts of the transition arrangement of FIG. 2.

With reference to FIG. 2, there is shown an enlarged cross-section side view of the left portion of FIG. 1, and FIG. 3 is a plan view of the transition assembly 702 of FIG. 2. Shown in the figures is the exit end 704 of the conveyor system 10 which includes a number of grouser plates or flights 706 that typically are on the order of 8 feet wide and are rigid metal members. Except for their width, the flights are similar to the metal tracks of bulldozers. A brace 708 to help support the structure, and especially the side boards or angled sides 32, is best seen in FIG. 4 and is located at the exit end 704.

Also attached at the exit end is the transition assembly 702 which primarily is made up of the finger assembly 718 which acts as a ramp, and dirt or small material plate or ramp 720. The finger assembly 718 has three fingers 710 mounted at the base end 712 to a finger base 716. It is to be noted that the remote or exit end 714 of the fingers are tapered so that they are narrower than the base end in 712. Thus, the openings 722 between the fingers are also tapered with the wide portion at the exit end and narrower portion at the base end. Thus, the sides of the fingers diverge as they extend outwardly so that as boulders roll or slide down the finger ramp 710 they will not be caught in the openings.

As is seen from FIG. 2 the finger ramp 710 is at an approximate 30 degree angle to the horizonal. Underneath the finger ramp 710 is a dirt or small material plate or ramp 720. As seen from FIGS. 2 and 3, this ramp is approximately 65 degrees to the horizontal and does not extend as far as the finger ramp 710 and underlies the finger ramp 710 and especially the openings 722 at the base end of the fingers.

Figure 4:
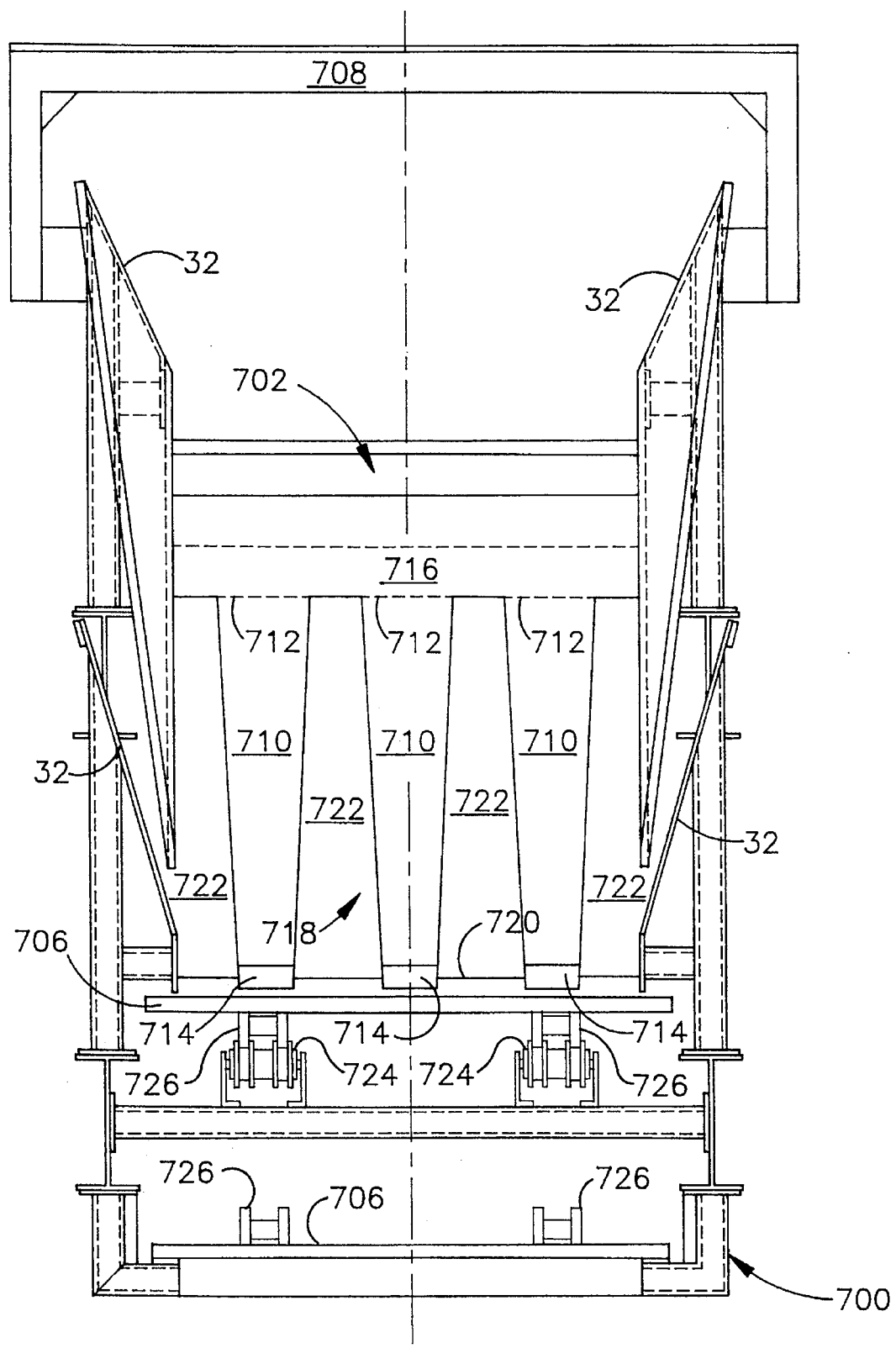
FIG. 4 is a schematic view looking into the exit end of a conveyor showing the transition arrangement.

With reference to FIG. 4 there is shown a cross-section end view looking towards the discharge or exit end 704 of conveyor system 10 showing the parts just described. In addition, it shows a cross-section of the conveyor 700 which has the grouser plate 706 connected to conveyor chain 726 with the top of the conveyor that is carrying the material being supported by roller 724. The lower grouser plate 706 shows the portion of the conveyor on its empty return trip. In this FIG. 4, the conveyor 700 is attached to the conveyor system 10, but normally such an attachment would not be used as there can be some slight variation in the angles between the conveyor 700 and the conveyor system 10 as well as subsequent conveyors located in the sequence which are not shown.

The transition assembly 702 performs a unique and important function. The overburden is made up of large rock graded down to dirt and if the large rock is dumped from the exit end of one conveyor directly onto the entrance end of the next conveyor, a tremendous shock would be placed on the system that could damage it and require down time for repair. To ease this shock, the overburden as it exits from the first conveyor to the second conveyor is directed down the finger ramp 710. The large rocks are too large to fall into the openings 722 and are guided at a gentle slope down to the second conveyor. Meanwhile, smaller material falls between the fingers onto the dirt or small material plate or ramp 720 and is guided onto the conveyor surface. Some of the rock that is being guided down the finger ramp 710 that was originally too large to fall in the narrow openings at the base will fall into the opening 722 as they widen towards the end 714. So in addition to the initial dirt and small rock on the conveyor 700 that slide down ramp 720, some additional rock will fall onto that surface. This forms a layer of dirt and small rock that is under the exit end 714 of finger ramp 710 as the large boulders contact the conveyor. This initial layer provided by the dirt and small stones serves to cushion the impact of the large boulders that are sliding or rolling down finger ramp 710 to help protect conveyor 700.

Obviously, the number of fingers can vary from the three fingers shown to four fingers, five fingers, or whatever number appears to be appropriate. Also, the space between the fingers can be varied as is appropriate for the materials being handled. It is to be noted that the finger ramp 710 has its exit end 714 above the surface of the conveyor approximately five inches or greater to provide for the cushion material of dirt and small rock. Typically a conveyor would be 8 feet wide and the fingers 710 would be made from steel plate on the order of 2 inches in thickness.

Figure 5:
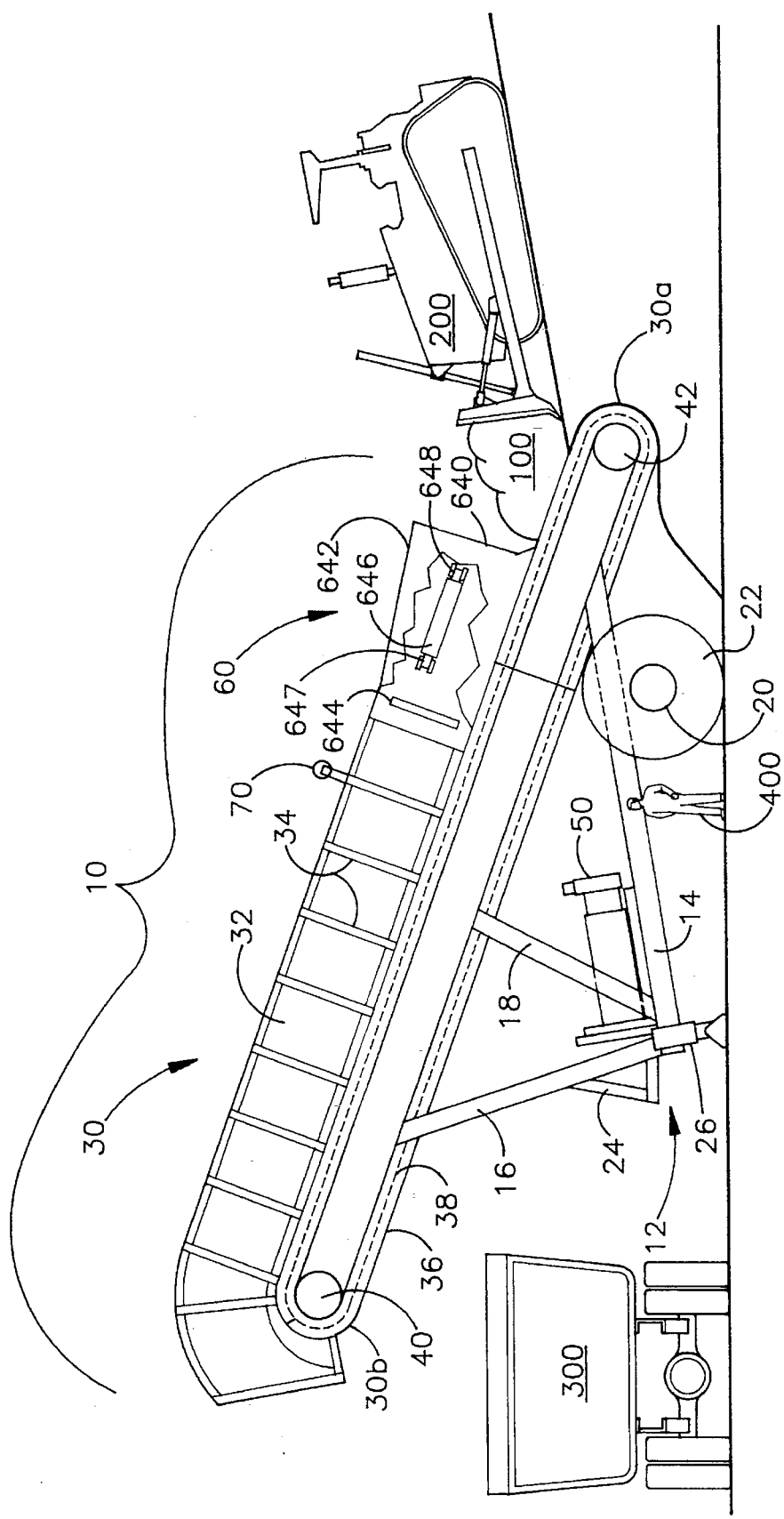
FIG. 5 is a side elevational schematic view, partially cut away, of the present invention as it is used to convey material pushed by a bulldozer to a heavy-duty truck.

With reference to FIG. 5, the conveyor system of the present invention is shown and referenced generally by the numeral 10. Heavy material (e.g., overburden from strip mining operations, earth from excavation operations, etc.) 100 is pushed by a bulldozer 200 along the ground to conveyor system 10 where it is conveyed to heavy-duty truck 300 or other receptacle or to a conveyor 700 as shown in FIG. 1. For appreciation of the scale of conveyor system 10, a schematic man 400 is provided in front of conveyor system 10.

Conveyor system 10 is built on a sturdy base or frame 12 which typically includes a plurality of frame members such as I-beams. By way of non-limiting example, one such frame 12 includes horizontal frame member 14 and vertical support frame members 16 and 18 depending from horizontal frame member 14. Maneuverability of conveyor system 10 can be facilitated by providing at least one axle 20 running transverse to horizontal frame member 14. Typically, one or more wheels would be mounted on each end of axle 20. Such wheels are represented in the drawings by wheel 22. As will be explained further below, towing of conveyor system 10 is facilitated by hitch 24 depending from vertical support member 16. Further, raising and lowering of conveyor system 10 is facilitated by hydraulic jack 26.

Mounted on frame 12 is heavy-duty conveyor 30 having inlet end 30a and outlet end 30b. Typically, conveyor 30 is trough-like in its transversal cross-section with vertical sides 32 supported by vertical frames 34 depending from conveyor housing 36. A continuous path conveyor belt, represented by dashed lines 38, moves within conveyor housing 36 to convey material 100 from feed end 30a to conveying end 30b. Conveyor belt 38 is of the heavy-duty construction type made from standard cleated shoes or grousers well known in the field of hydraulic bulldozers and excavators. Conveyor belt 38 forms a continuous path around sprockets 40 and 42. Typically, sprocket 40 is a drive sprocket and sprocket 42 is an idler sprocket. Sprocket 40 is driven by any one of a variety of linkage mechanisms (not shown for purpose of clarity) powered by engine 50 mounted on frame 12. Such linkages may include, typically, electric drives or hydraulic drives together with transmission boxes which are well known to those skilled in the art.

Figure 6:
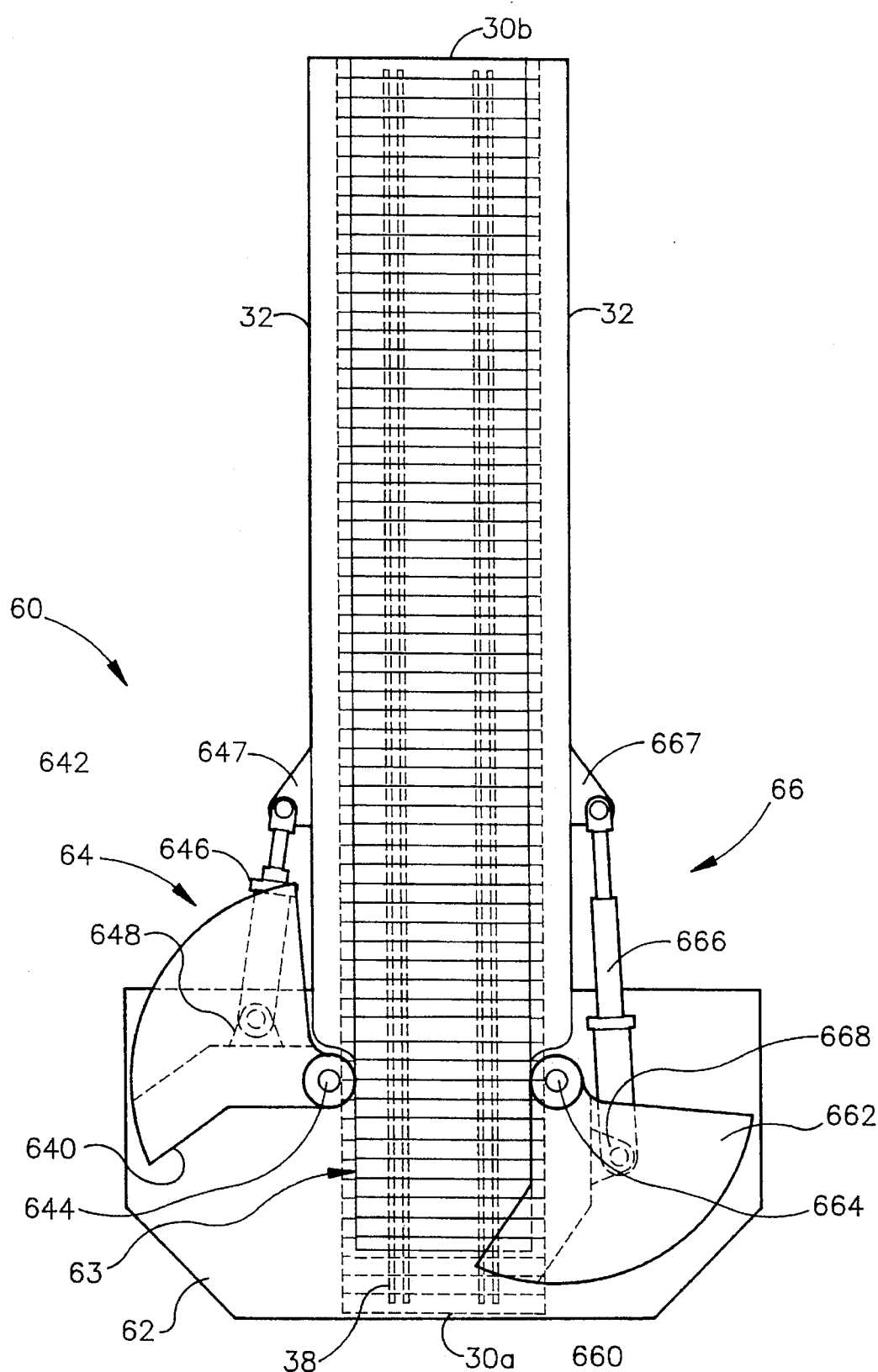
FIG. 6 is a schematic plan view of the conveyor and conveyor feeder of the present invention.
Figure 7:
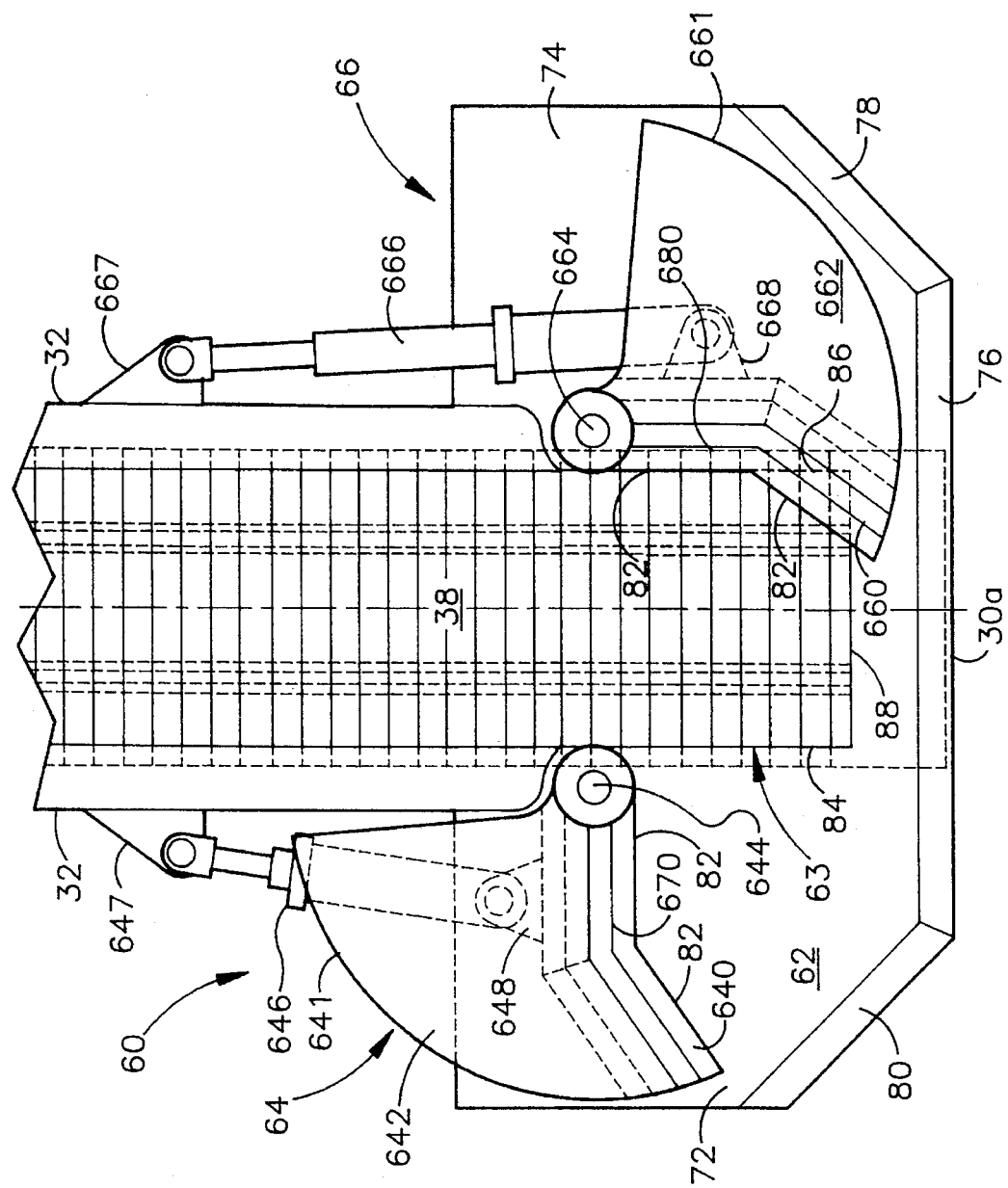
FIG. 7 is a schematic broken-away plan view of the pusher blade and apron area of the present invention.

Referring now to FIGS. 5–7 simultaneously, common reference numerals will be used for common elements. Mounted near inlet end 30a is rotating pusher blade and apron assembly 60 which includes apron 62, left pusher blade assembly 64 (shown in FIGS. 6 and 7 in its retracted position), and right pusher blade assembly 66 (shown in FIGS. 6 and 7 in its fully actuated or swept position). Apron 62 is typically a rugged flat or planar plate of steel on the order of ¾–1 inch thick mounted on the frame 12. The apron 62 has a left side 72, a right side 74 and front side 76. It also has a right corner 78 and left corner 80, both of which are angled cut-offs bridging from the sides 72 and 74 to the front side 76. The right corner 78, left corner 80 and front side 76 are rounded off as best seen in profile at FIGS. 5 and 8.

The entire area of apron 62 which is swept by pusher blade assemblies 64 and 66 is planar or flat with the toe 82 of the blades riding on the surface of the apron to gather and push the material thereon to a center area for conveying to another conveyor or to a truck.

Left pusher blade assembly 64 and right pusher blade assembly 66 are preferably cut from a standard bulldozer blade by severing the blade in half down the center line. The left half of the blade is used to manufacture left pusher blade assembly 64 by adding the pivoting arrangement in the form of a hinge 644 and a prime-mover hydraulic cylinder 646 for rotating the blade. Each hydraulic cylinder, as best seen by the right hydraulic cylinder 666 extended in FIG. 6, is made up of three sections which telescope together. The right pusher blade assembly 66 is similar to the left pusher blade assembly with a hinge 664 and each assembly has a pusher blade toe 82 at the bottom thereof which rides over the surface of apron 62 to scrape the material therefrom.

As viewed in plan view in FIG. 6 and FIG. 7, the pusher blade assemblies have an inside blade area 670 and 680 which are closest to the pivot point and angled outside area 640 and 660 which are in effect hooked inward to gather the material towards the pivot point as it is swept from the apron.

As shown in FIGS. 6 and 7, apron 62 includes a generally U-shaped cutout 63 with a left side 84, right side 86 and front area 88 that is slightly narrower than the width of conveyor belt 38. Apron 62/U-shaped cutout 63 are positioned such that apron 62 extends around inlet end 30a to essentially peninsulate a portion thereof. In the preferred embodiment, the top surface of apron 62 is maintained essentially parallel with the surface of conveyor belt 38. Further, apron 62 is maintained at a height substantially on a level with conveyor belt 38 but 1 to 2 inches above the cleats of belt 38 to permit the belt to move thereunder. U-shaped cutout 63 is sized slightly narrower than the width of conveyor belt 38 so as to overlap belt 38 approximately 6 inches on the sides 84 and 86 of cutout 63 and is centered over conveyor belt 38. Apron 62 projects over conveyor belt 38 in the front area 88 of U-shaped cutout 63.

Left and right pusher blade assemblies 64 and 66 are identical in construction and are mounted in mirror image fashion on apron 62 on either side of conveyor 30. Each pusher blade assembly 64 and 66 includes respectively: blade areas 640, 670 and 660, 680; arcuate blade skirts 641 and 661 extending behind blade areas 640 and 660; roofs 642 and 662 over the swept area; hinges 644 and 664 mounted vertically to apron 62; and hydraulic cylinders 646 and 666 fixedly depending on frame 12 from opposing sides of conveyor 30 by means of brackets 647 and 667 and hingedly depending from the back side of blade areas 670 and 680 by means of hinge brackets 648 and 668. The front of each angled outside blade area 640 and 660 and each inside blade area 670 and 680 is concave in shape and is typically constructed similar to the blade of a bulldozer. The bottom portion of blade areas 640, 670 and 660, 680, adjacent apron 62 has an abrasion resistant toe 82.

Each pusher blade assembly 64 and 66 is independently operated by hydraulic cylinders 646 and 666 to move from its retracted position to its fully swept position. More specifically, the retracted position of each pusher blade assembly has its blade area facing essentially perpendicular to the movement of conveyor belt 38 as shown in FIG. 6 for left feeder blade assembly 64. The fully swept position is assumed when one of the respective hydraulic cylinders is energized. The respective blade area is then swept through an approximately 90° arc as the extending hydraulic cylinder pivots about its hinged bracket. The blade area pushes any material in front thereof along apron 62 toward U-shaped cutout 63 where such material flows onto conveyor belt 38. This fully swept position is shown for right pusher blade assembly 66. Operation of hydraulic cylinders 646 and 666 are powered by means of a high-pressure hydraulic pump (not shown) which is in turn powered by engine 50. Actuation of each hydraulic cylinder is carried out manually or by means of remote control.

Figure 8:
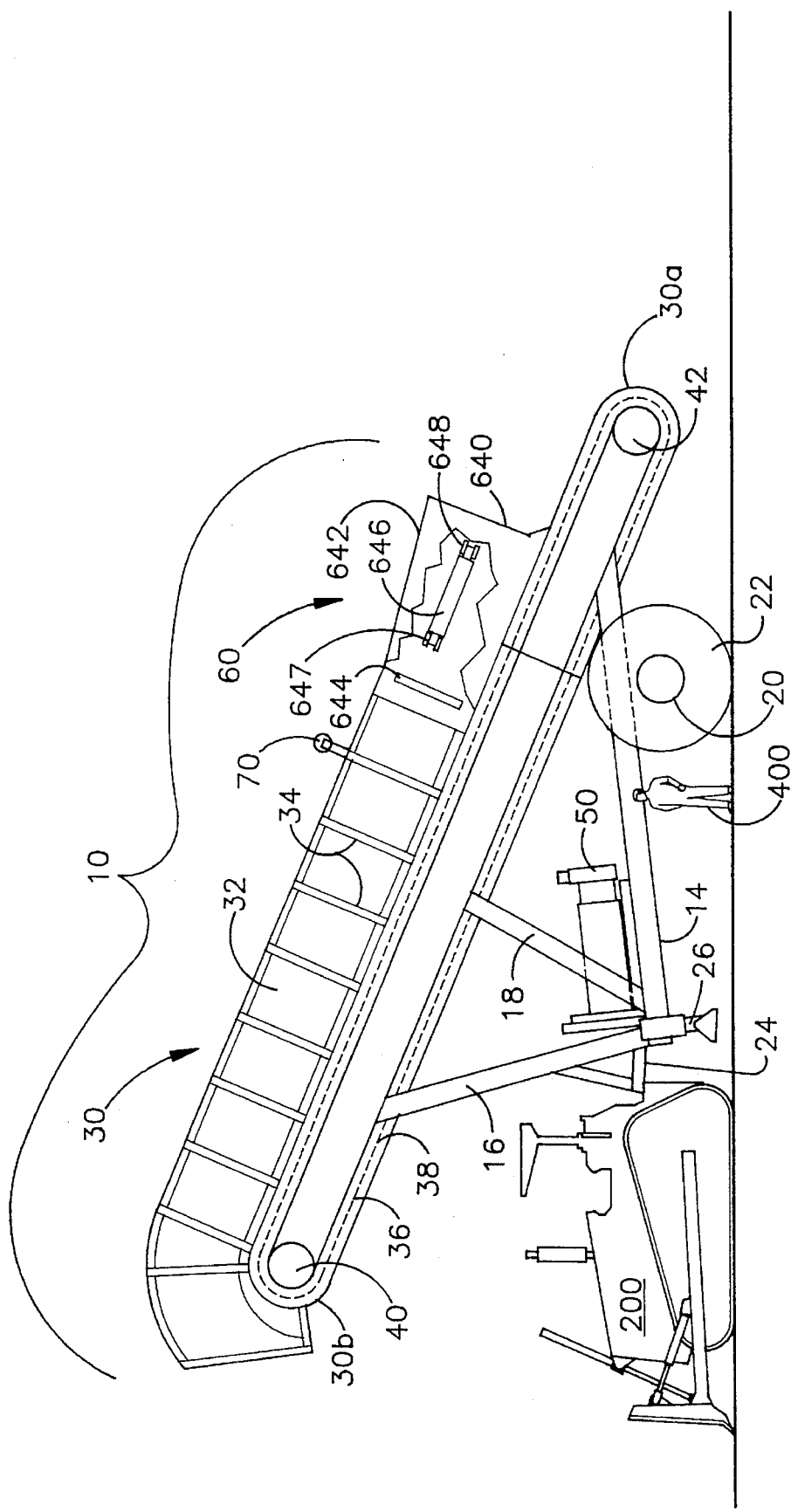
FIG. 8 is a side elevational schematic view of the present invention as it is being transported by a heavy-duty transport vehicle.

In order to prevent material from falling behind blade areas 640 and 660 and disrupting movement thereof, arcuate skirts 641 and 661 extend from an attachment affixing the skirts to the outboard edge of each pusher blade to the rear of its sweep and extends from the lowermost edge to substantially the height of the blade. The arc is the same radius of the edge of the blade as it pivots about its pivot. The skirts are made, preferably, from rolled steel and prevents debris from collecting behind the blades. Also, provided to prevent debris from falling over the top of the blades are roofs 642 and 662 which extend substantially parallel to the respective areas swept by the pusher blades. As seen in FIG. 8 the roof, which is preferably made of steel sheet is relatively flat and extends relatively parallel to apron 62 although there is a slight slope downward from the height where it is affixed to the top of the pusher blade. The roofs, as shown, cover the hydraulic cylinders. Thus, throughout its entire range of motion, each pusher blade assembly is closed with respect to material overflow. Any material riding over the top of blade areas 640 and 660 merely remains on the roofs 642 and 662 or falls to the ground since pusher blade assemblies 64 and 66 overhang the ground on either side of conveyor system 10.

In operation, a heavy-duty transport vehicle, e.g., bulldozer 200, tows conveyor system 10 by means of hitch 24 as shown in FIG. 8. Note that hydraulic jack 26 is typically retracted during transport of conveyor system 10. Conveyor system 10 is backed into a bank so that apron 62 is located where material can be pushed or pulled thereon. Bulldozer 200 is then detached from hitch 24 and hydraulic jack 26 is used to adjust the height of conveying end 30b based on the height of the conveyor which is to receive the material or the size of the truck to be filled and/or the resting position of the apron on the ground. Bulldozer 200 pushes material 100 onto apron 62 as shown in FIG. 5. A light system would typically be provided on conveyor system 10 as represented by light 70. For example, light 70 could light green when both pusher blade assemblies 64 and 66 are in their retracted position. If either feeder blade assembly were actuated, then light 70 could light red to indicate to the bulldozer operator(s) not to push material 100 onto apron 62. Material could also be pulled onto the apron by a shovel (not shown).

When both pusher blade assemblies 64 and 66 are in their retracted positions, note that apron 62 is open to receive material from the front and either side of conveyor system 10. Accordingly, two or three bulldozers can push material to conveyor system 10 from directions spanning approximately 180° in front of inlet end 30a. By improving the loading operation, the present invention reduces overall load cycle times. Further, since each pusher blade assembly can be swept through an approximately 90° arc, all material on the respective side of apron 62 is cleaned with a single stroke. The independent operation of each pusher blade assembly, which is in effect a pivoting one-half of a bulldozer blade, further provides for the possibility of pushing material from the ground towards one side of apron 62 while the other side is swept clean onto conveyor belt 38.

Sizing of rotating pusher blade and apron assembly 60 is commensurate with the size of conveyor 30, material 100 and equipment used to move material 100, e.g., bulldozer 200. For example, large bulldozers such as the Caterpillar D11 or the Kamatsu 475 have blades that are 22 feet in length and 8 feet in height. While heavy-duty grousers 706 used to make conveyor 30 are usually in an 8 foot widths and usually have cleats on the outer surface. Each pusher blade area 640 and 660 is nominally 8 feet high and approximately 14 feet in length.

While the pusher blade and apron assembly are shown in connection with a moving belt conveyor similar to those of Torgerson of Kent, Wash. or shown in U.S. Pat. No. 5,263,800; the assembly may be used with other types of conveyors including flexible belts and other mechanical arrangements.

The conveyor system 10 of FIG. 1 is similar to the conveyor system 10 of FIG. 5 except for the addition of a transition assembly 702. Also the frame which is omitted from FIG. 1 may be sized so that a different height may be used but still retain the advantages of moveability.

Likewise, the conveyor 700 would be like conveyor system 10 including a frame similar to that of FIG. 5 for manueverability. However, it would not have the rotating pusher blade and apron assembly 60, but would have the transition assembly 702. Its length can vary on the order of 50–100 feet and a number of identical sections can be sequenced together, each with its own drive mechanism for conveying heavy material for varying distance.

Although the invention has been described relative to specific embodiments thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. A conveyor system, comprising:

a frame;

a conveyor having an inlet end and a discharge end for conveying material received in the vicinity of said inlet end;

an apron having a planar surface mounted on said frame adjacent said inlet end for receiving material;

a first pusher blade having an outboard side edge and a pivot mount adjacent a first side of said conveyor adapted to pivot and sweep a first arc over said planar surface towards the vicinity of said inlet end for pushing said received material onto said conveyor at said vicinity of said inlet end;

a second pusher blade having an outboard side edge and a pivot mount adjacent a second side of said conveyor adapted to pivot and sweep a second arc over said planar surface towards the vicinity of said inlet end for pushing said received material onto said conveyor at said vicinity of said inlet end; and an arcurate skirt affixed to said outboard edge of each of said pusher blades that extends upward from said planar surface to prevent material being swept from said planar surface from entering behind said pusher blades.

2. A conveyor system as in claim 1, wherein said apron lies in a plane that is substantially parallel with and spaced a vertical distance slightly above said conveyor in the area where said first and second pusher blades sweep through their respective said first and second arcs.

3. A conveyor system as in claim 2, wherein said apron overhangs said conveyor in said vicinity of said first end.

4. A conveyor system as in claim 2, wherein said vertical distance is on the order of 1 to 2 inches.

5. A conveyor system as in claim 1, wherein said first and second pusher blades are operable independently of one another.

6. A conveyor system as in claim 1, wherein each of said first and second pusher blades is concave with respect to said first and second arcs, respectively.

7. A conveyor system as in claim 1, wherein each of said first and second pusher blades has a bottom blade portion and a top blade portion, each of said bottom blade portions in located in close proximity to said feed surface, and each of said corresponding top blade portions located a vertical distance above said apron.

8. A conveyor system as in claim 7, further comprising:

a first roof extending from said top blade portion of said first pusher blade, said first roof covering a first area above said apron swept by said first arc; and a second roof extending from said top blade portion of said second pusher blade, said second roof covering a second area above said apron swept by said second arc.

9. A conveyor system as in claim 1, further comprising hydraulic prime mover having first and second independently operable hydraulic cylinders depending on one end thereof, respectively, from said frame on first and second sides of said conveyor, and pivotally depending on another end thereof, respectively, from said first and second pusher blades.

10. A conveyor System, comprising:

a frame;

a conveyor supported on said frame and having first and second ends for conveying material received in a vicinity of said first end to said second end where said material falls off said second end;

apron having a width greater than that of said conveyor in said vicinity of said first end for receiving material from directions that span approximately 180 degrees about said vicinity of said first end;

a first pusher blade having a concave face pivotally mounted adjacent a first side of said conveyor for sweeping a first arc along said apron to push material received on said apron onto said conveyor at said vicinity of said first end; said first pusher blade starting said first arc at a position approximately perpendicular to the movement of said conveyor;

a second pusher blade having a concave face pivotally mounted adjacent a second side of said conveyor for sweeping a second arc along said apron to push material received on said apron onto said conveyor at said vicinity of said first end, said second pusher blade starting said second arc at a position approximately perpendicular to movement of said conveyor;

an hydraulic prime mover for said pusher blades having first and second independently operable hydraulic cylinders depending on one end thereof, respectively, from said frame at first and seconds sides of said conveyor, and pivotally depending on another end thereof, respectively from said first and second pusher blades;

a first roof extending from said first blade to cover said first hydraulic cylinder as said first pusher blade is swept through said first arc; and a second roof extending from said second blade to cover said second hydraulic cylinder as said second pusher blade is swept through said second arc.

11. A conveyor system as in claim 10, wherein said first roof covers an area formed by said first arc and said second roof covers an area formed by said second arc.

12. A conveyor system, comprising:

a frame;

a conveyor having an inlet end and a discharge end for conveying material received in a vicinity of said inlet end to said discharge end; a transition assembly located at said discharge end of said conveyor for lessening the impact of large pieces of material when discharged from said conveyor, said transition assembly comprising:

an incline ramp for receiving large pieces of material being discharge from said conveyor;

openings in said ramp permitting small pieces of material being discharged from said conveyor to fall through said openings;

an apron having a planar surface mounted on said frame adjacent said inlet end for receiving material;

a first pusher blade having an outboard side edge and a pivot mount adjacent a first side of said conveyor adapted to pivot and sweep a first arc over said planar surface towards the vicinity of said inlet end for pushing said received material onto said conveyor at said vicinity of said inlet end;

a second pusher blade having an outboard side edge and a pivot mount adjacent a second side of said conveyor adapted to pivot and sweep a second arc over said planar surface towards the vicinity of said inlet end for pushing said received material onto said conveyor at said vicinity of said inlet end; and an arcurate skirt affixed to said outboard edge of each of said pusher blades that extends upward from said planar surface to prevent material being swept from said planar surface from entering behind said pusher blades.

* * * * *